Feb. 18, 1969  H. K. LOTZ  3,428,302
SUPERVISORY EQUIPMENT FOR CUTTING TORCH MACHINES
IN CONTINUOUS CASTING INSTALLATIONS
Filed July 26, 1965

United States Patent Office 3,428,302
Patented Feb. 18, 1969

3,428,302
SUPERVISORY EQUIPMENT FOR CUTTING TORCH MACHINES IN CONTINUOUS CASTING INSTALLATIONS
Horst K. Lotz, Frankfurt am Main, Germany, assignor to Messer Griesheim G.m.b.H., a corporation of Germany
Filed July 26, 1965, Ser. No. 474,915
Claims priority, application Germany, July 30, 1964, M 61,932
U.S. Cl. 266—23                7 Claims
Int. Cl. B23k 5/00; B65h 17/22

ABSTRACT OF THE DISCLOSURE

A supervisory device for flame cutting machines used in continuous casting installations which employ cutting torches to cut segments from the continuously cast work piece includes a roller downstream from the cutting torch and pressing against the segment to activate the supervisory device when there is an incomplete cutting of the segment.

---

Figure 1:
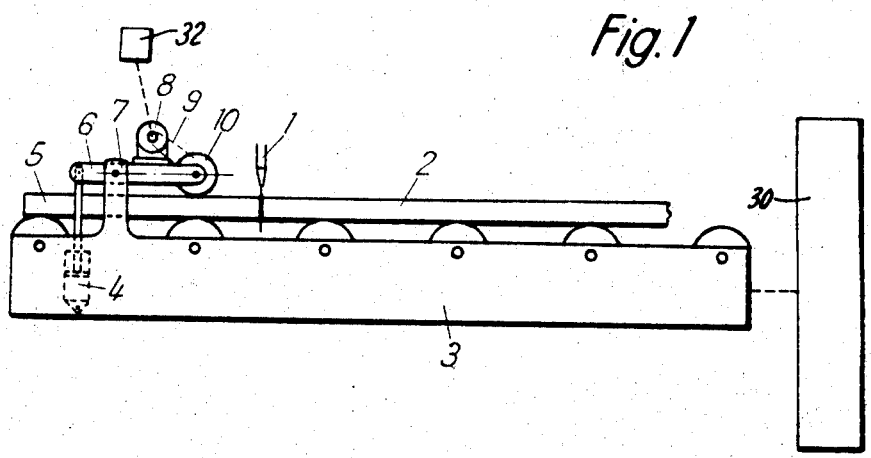

This invention relates to a device for supervising the operation of a cutting torch at continuous casting installations.

In continuous casting installations, the workpiece leaving the melting pot is split up or cut into individual blocks which is accomplished by means of automatic cutting torch machines. However, in case of failure of the cutting torch machine, when the machine is not supervised by an attendant, a satisfactory separation of workpiece and block may not be achieved. As a result considerable damage is done to the automatically operating equipment by the continually passing workpiece, as well as a possible loss of a complete charge of workpiece. In such an instance, long intervals in operation must also occur, resulting in considerable expense. In order to avoid the constant supervision of the cutting torch machine by an attendant, there have already been provided special supervisory devices in the operating range of the cutting machine. For instance, constant discharge controls are conducted for the machinery materials of the cutting torch machine, such as oxygen, fuel gas, electrical current, etc. In such a manner, however, cutting interruptions as a result of the material to be cut are detected with some difficulty. For supervision, therefore, ultrasonics, X-rays, atomic current, etc. has been installed to be able to determine or detect when the burner suddenly no longer produces a cutting gap. These known supervisory processes, however, meet considerable difficulties in practice since they are affected by the temperature of the material to be cut, the loss of heat, and the slag discard at the cutting gap.

An object of this invention is to provide supervisory equipment which overcomes the above described difficulties and disadvantages.

According to this invention, the described disadvantages and difficulties are eliminated in a simple and advantageous manner by providing a roller which is pressed on the workpiece in the movement of direction of travel of the workpiece behind the cutting torch to activate the operation of the supervisory equipment. For activation, a driving roller or a set of driving rollers, designed for the removal at increased speed, of the cut-off ingots or sections of the workpiece, is preferable for the supervisory equipment. This driving roller or the set of driving rollers advantageously acts as a detecting device when, after the work process, the cutting operation is not completely carried out.

By removal of the separated pieces with increased speed, their fusing of baking on to the workpiece is avoided. In operation, the driving roller is pressed on the section to be cut off and is thus switched on when the torch is just before the cutting end. The driving roller activation or switching is done by mechanical means irrespective of whether the torch is lit, so that in any case the driving roller can act as the supervisory or detecting device.

If the driving roller cannot remove a section (when the separating cut is incomplete or did not occur at all) there results an overload on the driving motor of the driving roller. This overload is indicated to the attendant of the continuous casting installation, by means of a control device in the driving roller motor which is actuated in the case of irregularities in the work process.

The control device suitably consists of an electrical bimetal overload safety fuse, known per se, for the electric motor. Alternatively the control device can also be a known safety coupling with a limit switch inserted between the driving roller and the motor.

In activating the control device, the roller drive, for example, is switched off. This sets off an optical or acoustical signal on the pouring platform, which stops the pouring as to that particular workpiece. As a result, the immediate investigation and eventual manual operation of the cutting torch machine is done. Finally by means of corresponding switching in the cutting torch machine, all distortions are automatically met in order to facilitate the subsequent take-over by the attendant. Under some circumstances, the cutting machine itself carries out at a slower cutting speed a renewed cutting process by means of suitable control measures.

These steps can be used even with burning or melting cutters for the separation of finished and semi-finished products of the most varied materials in various production processes.

Figure 2:
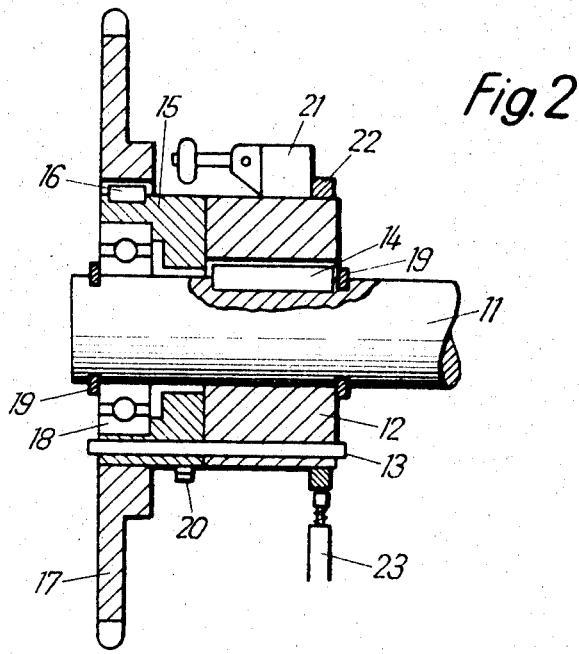

Novel features and advantages of the present invention will become apparent to one skilled in the art from a reading of the following description in conjunction with the accompanying drawings wherein similar reference characters refer to similar parts and in which:

FIG. 1 is the roller bed of a continuous casting installation with a set of driving rollers; and FIG. 2 is a safety coupling for the set of driving rollers.

In FIG. 1 is shown the basic arrangement of this invention. The cast workpiece 2 travels from right to left, riding on roller bed 3 which leads from a conventional continuous casting machine 30. The workpiece 2 is cut into ingots 5 by overhead torch 1. Torch 1 may for example reciprocate above workpiece 2 moving at the same speed as workpiece 2. During the forward movement of torch 1 the cutting operation takes place. Since both workpiece 2 and torch 1 are moving at the same speed there is no relative speed between them and the torch thus operates at the same location of workpiece 2. The cutting operation is completed when torch 1 is in the position shown in FIG. 1. Torch 1 thereupon moves in its backward direction to begin another cutting operation.

The pressing device is shown to the left or in back of torch 1 in FIG. 1. This device includes a compressed air cylinder-piston assembly 4 which is connected to lever 6 for pressing driving roller 10 against ingot 5. Lever 6 pivots in bracket 7. As also indicated in FIG. 1 roller 10 is driven by motor 8 through driving chain 9.

After cutting torch 1 has cut off ingot 5, the compressed air piston 4 presses driving roller 10 on ingot 5, which then is removed with greater speed than the speed of the workpiece. This assures ingot 5 of remaining severed from workpiece 2. However, if torch 1 fails so that a satisfactory separation of workpiece 2 and ingot 5 does not occur, then, of course, driving roller 10 cannot remove ingot 5 from the workpiece. Because of the increased pulling speed, motor 8 becomes overburdened. This overload is advantageously used according to the invention for the switching off of the motor by means of either a conventional bimetallic relay 32 schematically illustrated in FIG. 1 or by a safety coupling (FIG. 2) which sets off a signal as previously described.

According to the example of construction shown in FIG. 2 a safety coupling is used for the protection of the motor. This coupling is mounted on the driving roller shaft 11 and consists of 2 pairs of coupling disks 12 and 15 which are interconnected by a tangential pin 13 which disconnects at a predetermined load. The adjusting spring 14 assures a firm connection between driving roller shaft 11 and the coupling disk 12. The coupling disk 15 supports driving chain gear 17 which is mounted upon a ball bearing 18. Chain 9 (FIG. 1) is driven over gear 17. Both coupling disks 12 and 15 are prevented from a lateral displacement by means of rings 19. On the coupling disk 12 a trigger cam is mounted which activates the limit switch 21 upon the contact breaking of pin 13 and after slipping of the coupling when there is an overload. This results in the setting off of the aforementioned signal. The electric current for the limit switch is supplied across contact ring 22, which is mounted on the coupling disk 12, with the aid of a brush.

Since the invention should in no way be limited to the above-described example of construction, there are many possibilities of modified arrangements in the construction of the inventive equipment and in the arrangement and switching of the individual parts without departing from the scope of the invention.

What is claimed is:

1. Supervisory equipment for cutting torch machines in continuous casting installations comprising means for moving the continuously cast work piece in one direction, means for mounting the cutting torch machine to cut off a section of the work piece, a roller mounted on the discharge side of the cutting torch machine for pressing against the work piece, control means activated by said roller for detecting when a cutting operation is incomplete, drive means being connected to said roller for driving said roller at a speed faster than the speed of the moving work piece to accelerate the speed of the cut work piece section, and said control means including an electrical bimetallic overload safety fuse connected to said drive means.

2. Supervisory equipment for cutting torch machines in continuous casting installations comprising means for moving the continuously cast work piece in one direction, means for mounting the cutting torch machine to cut off a sectio of the work piece, a roller mounted on the discharge side of the cutting torch machine for pressing against the work piece, control means activated by said roller for detecting when a cutting operation is incomplete, drive means being connected to said roller for driving said roller at a speed faster than the speed of the moving work piece to accelerate the speed of the cut work piece section, and said control means including a safety coupling incorporating a limit switch between said roller and said drive means.

3. A supervisory device in combination therewith, continuous casting means for producing a continuously cast work piece, conveying means under the work piece for transporting the work piece away from the continuous casting means, cutting means above said conveying means for cutting a segment from the work piece, roller means above said conveying means positioned to press against the segment, said cutting means being located between said roller means and said continuous casting means, and drive means for said roller means to remove the segment at a faster speed than the speed of the work piece upon a complete cutting of the segment and for acting as detecting means upon an incomplete cutting of the segment.

4. A device as set forth in claim 3 wherein said drive means includes a driving motor, and said motor including control means for actuation during irregularities in the working sequence.

5. A device as set forth in claim 4 wherein said control means includes an electrical bimetallic overload safety fuse for said motor.

6. A device as set forth in claim 4 wherein said control means includes a safety coupling having a limit switch between said roller means and said motor.

7. A device as set forth in claim 3 including signal means connected to said drive means for indicating an incomplete segment cutting operation, and said drive means being adapted to be overloaded upon an incomplete segment cutting operation to actuate said signal means.

References Cited

UNITED STATES PATENTS

| | | | |
|---|---|---|---|
| 3,107,404 | 10/1963 | Armand et al. | 164—263 X |
| 3,145,373 | 8/1964 | Willard | 226—155 X |
| 3,278,999 | 10/1966 | Lemper | 104—263 |
| 3,299,538 | 1/1967 | Cooper | 226—25 X |

J. SPENCER OVERHOLSER, *Primary Examiner.*

EUGENE MAR, *Assistant Examiner.*

U.S. Cl. X.R.

226—25, 155; 83—156; 164—154, 263